Figure 1:
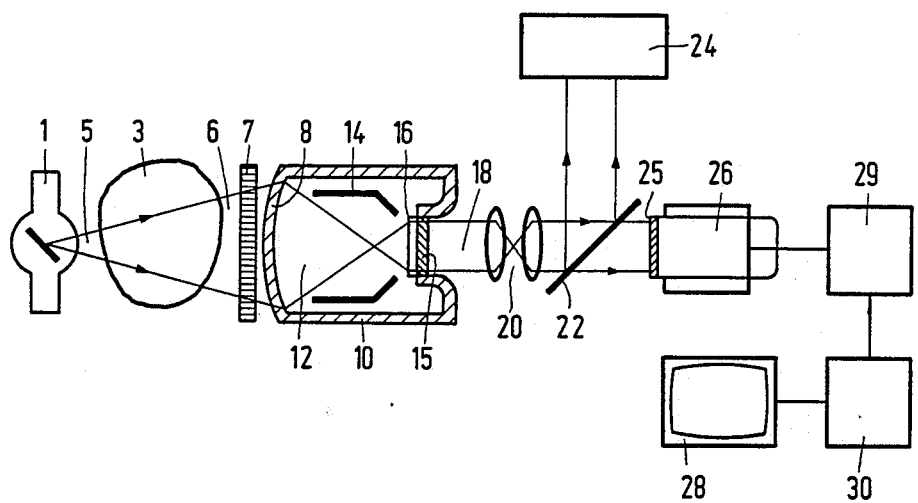

United States Patent [19]

Kemner et al.

[11] Patent Number: 4,952,794
[45] Date of Patent: Aug. 28, 1990

[54] X-RAY IMAGING SYSTEM

[75] Inventors: Rudolf Kemner; Pieter Zuidhof; Johannes J. Stouten, all of Eindhoven, Netherlands

[73] Assignee: U.S. Philips Corporation, New York, N.Y.

[21] Appl. No.: 388,284

[22] Filed: Aug. 1, 1989

[30] Foreign Application Priority Data

Aug. 4, 1988 [NL] Netherlands ............... 8801946

[51] Int. Cl.$^5$ ................ H01J 3/14; H01J 5/16
[52] U.S. Cl. ................... 250/213 VT; 358/111
[58] Field of Search ............ 250/213 VT, 483.1; 358/111; 313/528

[56] References Cited

U.S. PATENT DOCUMENTS 4,017,679  4/1977  Kemner et al. ............ 358/111
4,220,890  9/1980  Beekmans ............... 250/213 VT
4,352,127  9/1982  Tsuchiya .............. 250/213 VT
4,852,139  7/1989  Sandrick et al. .............. 358/111

Primary Examiner—David C. Nelms
Assistant Examiner—George Beck
Attorney, Agent, or Firm—William Squire

[57] ABSTRACT

As a result of the use of a slow phosphor in the exit screen of an X-ray image intensifier tube, a number of image fields can be picked up by means of the comparatively fast television camera during the afterglow of the phosphor. This enables quantum noise integration and, when use is made of a CCD camera upon display, a resolution can be achieved upon display which corresponds to the resolution of a conventional pick-up tube. Moreover, in accordance with the invention it is no longer necessary to use a controllable diaphragm and a complex interface for the asynchronous pick-up and reading of the image information.

6 Claims, 2 Drawing Sheets

X-RAY IMAGING SYSTEM

The invention relates to an X-ray imaging system, comprising an X-ray image intensifier tube having an entrance screen and an exit screen for converting an X-ray image to be projected onto the entrance screen into an optical image to be detected on the exit screen, a television pick-up device which cooperates with the exit screen in order to convert an optical image of the exit screen into a video signal for periodic formation of an image.

An X-ray imaging system of this kind is known from U.S. Pat. No. 4,220,890.

The cited Patent Specification discloses an X-ray imaging system in which an X-ray beam is incident on an entrance screen of an X-ray image intensifier tube after having irradiated an object to be examined. The entrance screen comprises a phosphor layer, preferably made of csI, and a photocathode. In the phosphor layer X-rays are converted into light quanta which release electrons in the photocathode. In the X-ray image intensifier tube the electrons are accelerated and focused on an exit screen which comprises a phosphor screen whereby the electron image is converted into an image carrying light beam. A semi-transparent mirror projects a part of the light beam onto a photographic film, another part being incident on an entrance screen of a television pick-up tube which converts the light beam into a video signal which can be displayed on a television monitor.

During continuous image pick-up, i.e. the so-called fluoroscopy mode of the system, the object to be examined is irradiated using a comparatively low X-ray intensity, for example from 1 to 2 $\mu R$ per half image period. When a single exposure is made, i.e. in the so-called exposure mode, a comparatively high radiation intensity is used in order to obtain a high signal-to-noise ratio, for example, from 50 to 70 $\mu R$. In order to prevent the television pick-up tube from being overexposed in the exposure mode, a controllable diaphragm must be inserted between the exit screen of the X-ray image intensifier tube and the entrance screen of the television pick-up tube. Because beginning and duration of the exposure are not related to the synchronisation of the television pick-up tube in the exposure mode, a complex interface is required for controlling the reading of image information accumulated on the entrance screen of the pick-up tube after termination of the exposure. Because image registration on the entrance screen of the television pick-up tube and reading of the image information accumulated on the entrance screen (synchronised with the display of the image information on the television monitor) are nor synchronised the use of, for example, a Vidicon television pick-up tube with a blanked scanning beam is necessary.

It is the object of the invention to provide an X-ray imaging system in which the described problems as regards the synchronisation of image pick-up and display are mitigated and in which a light intensity of the exit screen of the X-ray image intensifier tube lies within a dynamic range of the television pick-up device without it being necessary to use a controllable diaphragm.

To achieve this, an X-ray imaging system of the kind set forth in accordance with the invention is characterized in that the exit screen exhibits a pulse response which decreases as from an instant $t_0$ and that therefrom the television pick-up device can form, within a time interval T with a starting instant $t_1 \geq t_0$ and a duration of at least one image period of the video signal, a video signal which is determined by the instantaneous optical image of the exit screen.

Because the image information obtained from irradiation remains present on the exit screen of the X-ray image intensifier tube for a comparatively long period of time after termination of a radiation pulse, it is no longer necessary to sustain the image information on the entrance screen of the television pick-up device until a next image period commences. As a result, it is no longer necessary to suppress the reading of image information accumulated on the entrance screen of the television pick-up device. Because of the decreasing intensity of the light beam emitted by the exit screen of the X-ray image intensifier tube, the television pick-up device can reproduce the signal part which is situated within its dynamic range without requiring a diaphragm or the filtering of the light beam.

When an X-ray beam is converted into an image carrying light beam, a noise signal is produced which reduces the contrast in an X-ray image. The capture of electrons in the phosphor of the exit screen of the X-ray image intensifier tube so that light is emitted is accompanied by quantum noise. By using a comparatively slow phosphor or a comparatively fast television pick-up device, an image field can be repeatedly read, notably in the fluoroscopy mode with constant X-ray contents of the exit screen, and integration of the quantum noise can take place by combination of the images. Thus, a signal-to-noise ratio is improved.

From U.S. Pat. No. 4,017,679 an X-ray imaging system is known which has a fluoroscopy mode and an exposure mode. Said patent specification describes a synchronisation device which synchronises image pick-up, image storage in an image memory device and image display in the exposure mode so that the image displayed does not exhibit motional unsharpness and flicker effects. However, the cited Patent Specification does not disclose details as regards the construction of the image intensifier and the nature of the television pick-up tube.

A preferred embodiment of an X-ray imaging system in accordance with the inventiion is characterized in that the pick-up device comprises a CCD camera.

An image of the exit screen of the X-ray image intensifier tube remains present on the entrance screen of the television pick-up device, for example in the form of a charge distribution. In a television pick-up tube the charge distribution can be read in a line pattern which consists of two image fields which have been shifted with respect to one another in a vertical direction. In one half image period one image field is scanned. When the image fields are read, the charge distribution is erased and a charge distribution associated with a next image can be built up. In a CCD camera only one image field of image information can be accumulated on the entrance screen. This image field can be read, after which a second field of information can be accumulated. For suitable formation of one television image, two image fields are required. However, when a period of time required for building up a charge in a CCD camera is long in comparison with the afterglow of the exit screen of the X-ray image intensifier tube, a second charge distribution of the same image cannot be built up for the formation of the second image field (because the intensity of the optical image has already decreased too much), so that suitable imaging with a high resolution is difficult. By using a slow phosphor in the exit screen of the X-ray image intensifier tube in combination with a CCD camera, a plurality of image fields can be reproduced within the time of afterglow of the exit screen, thus enabling suitable imaging. As a result it is not necessary to apply, for example two radiation pulses for suitable imaging by means of a CCD camera, so that the radiation dose is limited.

An embodiment of an X-ray imaging system in accordance with the invention is characterized in that the X-ray imaging system comprises a multiplier which multiplies the video signal, at an instant t which is situated within the time interval T, by an inverse of the pulse response of the exit screen at the instant t.

For flicker-free display on a television monitor in the exposure mode it is desirable that two image fields which together constitute one image have the same brightness level. When a plurality of image fields are summed for integration of quantum noise, it is attractive when these fields also have the same brightness level. By utilising the knowledge of the afterglow curve of the phosphor in the exit screen of the X-ray image intensifier tube, the difference in brightness level can be compensated for by multiplying the image fields by the inverse of the afterglow curve. If the part of the pulse response of the exit screen which corresponds to the afterglow curve is described by the function g(t) and a first image fields is read at an instant $t_3$ multiplication by $g(t_3)/g(t)$ will make the brightness of a field read at an instant t equal to the brightness of the field read at the instant $t_3$.

A further embodiment of an X-ray imaging system in accordance with the invention is characterized in that the X-ray imaging system also comprises a synchronisation device, a video gate, a reference circuit for generating a reference signal which is dependent on the system mode, and a comparator whose input signals are formed by the output signals of the reference circuit and the television pick-up device, the comparator activating the synchronisation device in the case of equal input signals, which synchronisation device synchronises, during at least one image period, the video gate and the storage of the video signal in the image memory with a period equal to half the image period, the reference signal being at the most equal to the video signal which is determined by a maximum image intensity of the exit screen that can be reproduced by the television pick-up device.

A further embodiment of an X-ray imaging system in accordance with the invention is characterized in that the exit screen contains a phosphor layer with a mixed phosphor containing $Zn_2SiO_4(MnAs)$ and $Zn_2SiO_4(Mn)$ in a mixing ratio of approximately 2 to 1.

A CCD camera is a comparatively fast television pick-up device, so that the image lag of the exit screen of the X-ray image intensifier tube determines the image lag of the image intensifier/TV combination. The image lag of the mixing phosphor is such that the image lag of the image intensifier/TV combination approximates the image lag of an X-ray image intensifier tube having a comparatively fast phosphor in combination with a conventional television pick-up tube.

Some embodiments in accordance with the invention will be described in detail hereinafter with reference to the accompanying drawing. Therein FIG. 1 diagrammatically shows an X-ray imaging system, FIG. 2 is a detailed representation of an image processing device, and FIG. 3 shows the pulse response of a conventional television pick-up tube and of some phosphors.

FIG. 1 shows an X-ray source 1 which irradiates an object 3 to be examined by means of an Z-ray beam 5. An image carrying X-ray beam 6 is incident, preferably via a scatter grid 7, on an entrance screen 8 of an X-ray image intensifier tube 10. In a layer of scintillation material of the entrance screen X-ray quanta are converted into light quanta which release electrons in a photocathode. An image carrying electron beam 12 is imaged on an exit screen 15 comprising a phosphor layer 16 by means of an electron optical system 14. In the phosphor layer 16 an electron image is converted into an image-carrying light beam 18. In this case the light beam 18 is imaged on a film camera and on an entrance screen 25 of a television pick-up tube 26 by way of an optical system 20 and a semi-transparent mirror 22. The television pick-up tube 26 converts the optical image into a video signal which can be presented to an image memory 30 or to a monitor 28 via an image processing unit 29.

Figure 2:
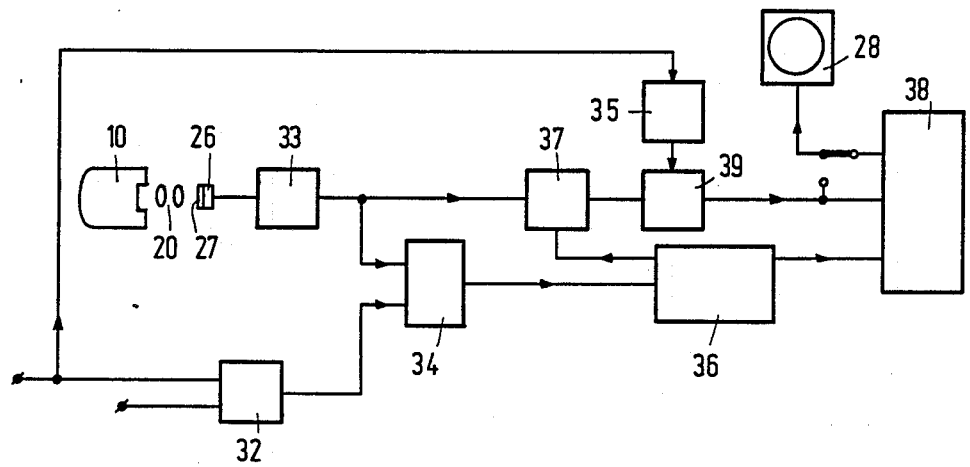

FIG. 2 diagrammatically shows an X-ray imaging system, an image processing unit 29 of which is shown in greater detail. The entrance screen of the television pick-up device 26 is formed by a CCD matrix 27. The input of a reference circuit 32 receives control signals which depend on the system mode. The reference circuit 32 supplies a reference signal which is compared, using a comparator 34, with a video signal that is multiplied by an amplifier 33. In the exposure mode the video signal will be multiplied by $g(t_3)/g(t)$, as from an instant $t_3$, by a multiplier which comprises a PROM 35 which is programmed with the afterglow curve of the phosphor on the exit screen 15 of the X-ray image intensifier tube, and which also comprises an amplifier 39. The reference signal supplied by the reference circuit corresponds to an upper limit of the dynamic range of the CCD camera 26 in the exposure mode. When both input signals of the comparator 34 are high, the comparator activates a synchronisation device 36. As from the beginning of a next half image period, the synchronisation device synchronises, the video gate 37 and the storage of the video signal in the image memory 38 with a period which equals half the image period. The X-ray image can be extracted from the image memory 38 for display on a monitor 28.

Figure 3:
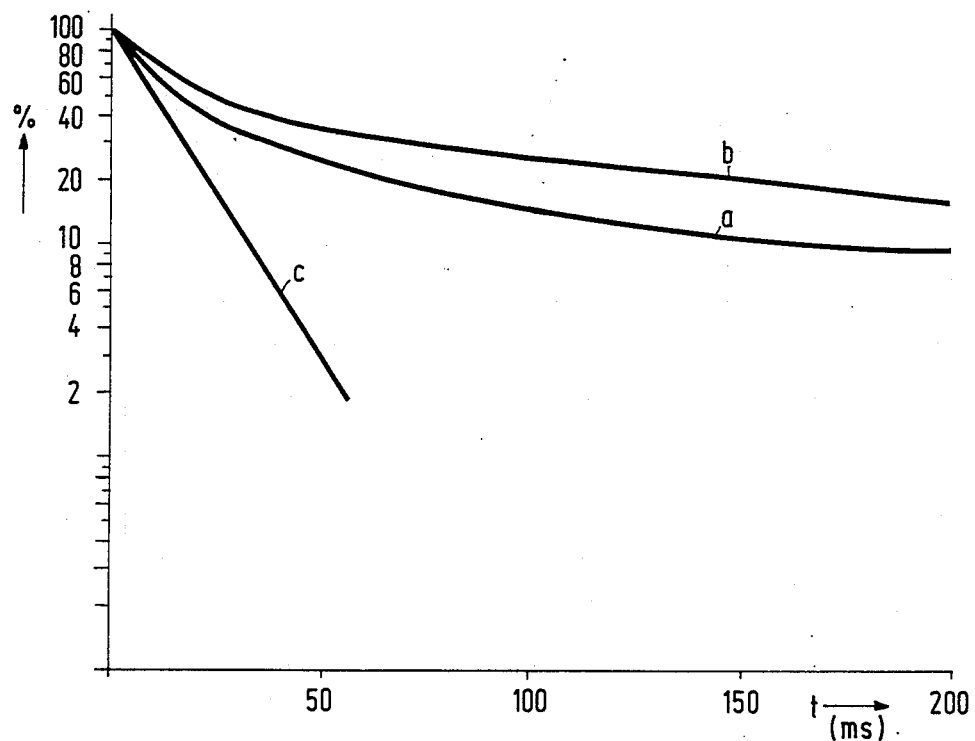

A curve a in FIG. 3 represents the pulse response of a conventional television pick-up tube, in this case a "Newvicon tube" is concerned. In two image periods (40 ms) the curve a drops to approximately 27% of the value at the instant t=0. The curves b and c represent the pulse response of an exit screen of an X-ray image intensifier tube comprising a phosphor screen containing $Zn_2SiO_4(MnAs)$ and $Zn_2SiO_4(Mn)$, respectively. By mixing the phosphors $Zn_2SiO_4(MnAs)$ and $Zn_2SiO_4(Mn)$ in a ratio of 2 to 1, a mixed phosphor is obtained having a pulse response which extends substantially in conformity with the curve a for the duration of at least one image period.

We claim:

1. An X-ray imaging system, comprising an X-ray image intensifier tube having an entrance screen and an exit screen for converting an X-ray image to be projected onto the entrance screen into an optical image to be detected on the exit screen, a television pick-up tube which cooperates with the exit screen in order to convert an optical image of the exit screen into a video signal for periodic formation of an image, characterized in that the exit screen exhibits a pulse response which decreases as from an instant $t_0$ and that therefrom the television pick-up device can form, within a time interval T with a starting instant $t_1 \geq t_0$ and a duration of at least one image period of the video signal, a video signal which is determined by the instantaneous optical image of the exit screen.

2. An X-ray imaging system as claimed in claim 1, characterized in that the television pick-up device comprises a CCD camera.

3. An X-ray imaging system as claimed in claim 1 or 2, characterized in that the X-ray imaging system comprises a multiplier which multiplies the video signal, at an instant t which is situated within the time interval T, by an inverse of the pulse response of the exit screen at the instant t.

4. An X-ray imaging system as claimed in claim 1, 2 or 3, having a first system mode for continuous image pick-up, a second system mode for non-continuous pick-up, a television monitor and an image memory, characterized in that the X-ray imaging system also comprises a synchronisation device, a video gate, a reference circuit for generating a reference signal which is dependent on the system mode and a comparator whose input signals are formed by the output signals of the reference circuit and the television pick-up device, the comparator activating the synchronisation device in the case of equal input signals, which synchronisation device synchronises, during at least one image period, the video gate and the storage of the video signal in the image memory with a period equal to half the image period, the reference signal being at the most equal to the video signal which is determined by a maximum image intensity of the exit screen that can be reproduced by the television pick-up device.

5. An X-ray imaging system as claimed in claim 2, characterized in that the exit screen contains a comparatively slow phosphor having a pulse response whose value after two video image periods is not substantially lower than approximately 25% of a value at $t_0$.

6. An X-ray imaging system as claimed in claim 5, characterized in that the exit screen contains a phosphor layer with a mixed phosphor containing $Zn_2SiO_4(MnAs)$ and $Zn_2SiO_4(Mn)$ in a mixing ratio of approximately 2 to 1.

* * * * *